United States Patent
Kistner et al.

(10) Patent No.: US 9,482,387 B2
(45) Date of Patent: *Nov. 1, 2016

(54) ROTOR MACHINE HAVING OIL SLINGER SYSTEM

(71) Applicant: GHH RAND SCHRAUBENKOMPRESSOREN GMBH, Oberhausen (DE)

(72) Inventors: Daniel Kistner, Munster (DE); Frank Banaszak, Recklinghausen (DE)

(73) Assignee: Ingersoll-Rand International Limited (Ireland), Swords (IE)

(*) Notice: Subject to any disclaimer, the term of this patent is extended or adjusted under 35 U.S.C. 154(b) by 245 days.

This patent is subject to a terminal disclaimer.

(21) Appl. No.: 14/027,181

(22) Filed: Sep. 14, 2013

(65) Prior Publication Data

US 2014/0076664 A1   Mar. 20, 2014

Related U.S. Application Data

(60) Provisional application No. 61/701,229, filed on Sep. 14, 2012.

(51) Int. Cl.
| | |
|---|---|
| F16N 7/26 | (2006.01) |
| F16N 7/18 | (2006.01) |
| F16D 1/09 | (2006.01) |
| F16D 1/092 | (2006.01) |

(52) U.S. Cl.
CPC . *F16N 7/26* (2013.01); *F16D 1/09* (2013.01); *F16D 1/092* (2013.01); *F16N 7/18* (2013.01)

(58) Field of Classification Search
CPC .............. F16N 7/16; F16N 7/24; F16N 7/26
See application file for complete search history.

(56) References Cited

U.S. PATENT DOCUMENTS

| | | | | |
|---|---|---|---|---|
| 1,116,845 | A * | 11/1914 | Rogers | 384/538 |
| 2,438,866 | A * | 3/1948 | Rockwell et al. | 416/244 R |
| 3,301,614 | A * | 1/1967 | Haentjens | 384/472 |
| 3,501,183 | A * | 3/1970 | Stratienko | 403/370 |
| 3,596,943 | A * | 8/1971 | Krauss | 403/370 |
| 3,687,233 | A | 8/1972 | Greenwald | |
| 4,171,137 | A | 10/1979 | Aizu et al. | |

(Continued)

FOREIGN PATENT DOCUMENTS

| | | |
|---|---|---|
| GB | 117015 | 7/1918 |
| GB | 558740 | 1/1944 |

OTHER PUBLICATIONS

International Preliminary Report on Patentability; International PCT Application No. PCT/US2013/059839; Mar. 17, 2015, 4 pages.

(Continued)

*Primary Examiner* — Minh Truong
(74) *Attorney, Agent, or Firm* — Taft, Stettinius & Hollister, LLP

(57) ABSTRACT

One embodiment of the present invention is a unique blower having an oil slinger system. Another embodiment is a unique rotor system having an oil slinger system. Other embodiments include apparatuses, systems, devices, hardware, methods, and combinations for rotor systems, blowers and other apparatuses that employ oil slinger systems. Further embodiments, forms, features, aspects, benefits, and advantages of the present application will become apparent from the description and figures provided herewith.

20 Claims, 3 Drawing Sheets

(56) References Cited

U.S. PATENT DOCUMENTS

| | | | | |
|---|---|---|---|---|
| 4,268,185 | A | * | 5/1981 | Mullenberg ............... 403/16 |
| 4,392,752 | A | | 7/1983 | Shimizu et al. |
| 4,596,477 | A | * | 6/1986 | Lundgren ............... 384/538 |
| 4,798,523 | A | | 1/1989 | Glaser et al. |
| 5,591,020 | A | | 1/1997 | Rockwood |
| 5,636,848 | A | | 6/1997 | Hager et al. |
| 5,876,127 | A | * | 3/1999 | Casey ............... 384/538 |
| 6,200,037 | B1 | | 3/2001 | Braun |
| 6,439,208 | B1 | | 8/2002 | Jones |
| 6,460,656 | B1 | * | 10/2002 | Jones et al. ............... 184/13.1 |
| 6,516,789 | B1 | | 2/2003 | Jones |
| 7,134,667 | B2 | | 11/2006 | Wiler |
| 8,028,524 | B2 | | 10/2011 | Middlebrook et al. |
| 2010/0000498 | A1 | * | 1/2010 | Middlebrook et al. .... 123/559.1 |
| 2014/0076663 | A1 | * | 3/2014 | Kistner et al. ............... 184/13.1 |

OTHER PUBLICATIONS

International Search Report and Written Opinion; International PCT Application No. PCT/US2013/059839; Feb. 18, 2014; 5 pages.

* cited by examiner

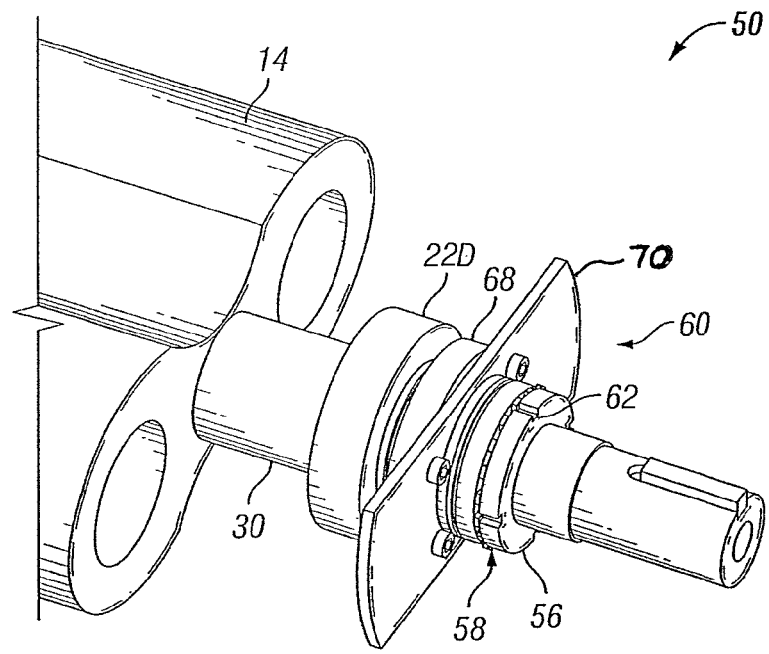
FIG. 2
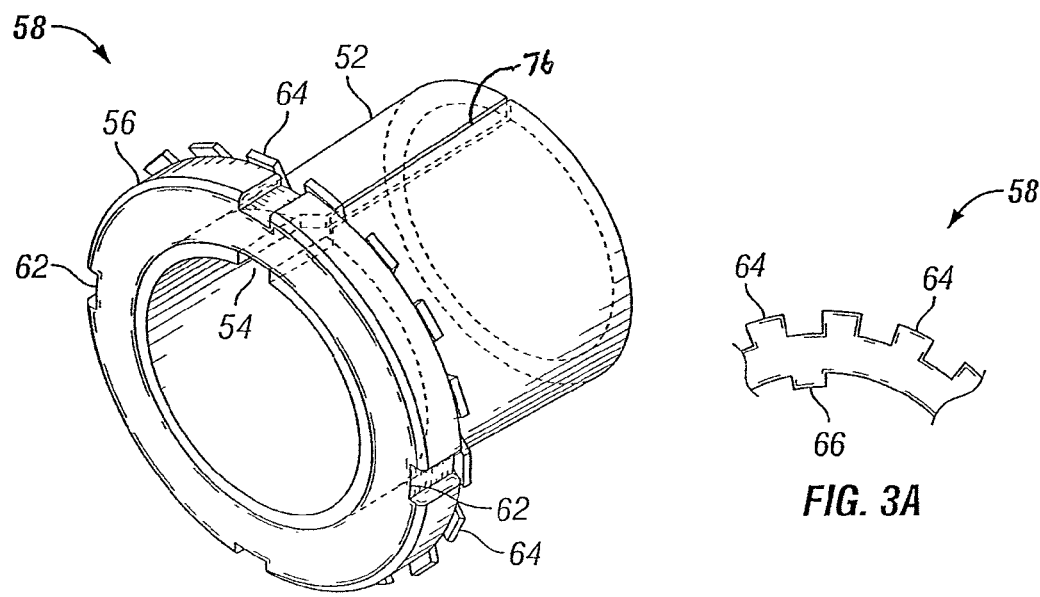
FIG. 3
FIG. 3A

ROTOR MACHINE HAVING OIL SLINGER SYSTEM

CROSS REFERENCE TO RELATED APPLICATIONS

The present application claims benefit of U.S. Provisional Patent Application No. 61/701,229 filed Sep. 14, 2012, entitled OIL SLINGER MOUNTING ARRANGEMENT, which is incorporated herein by reference.

FIELD OF THE INVENTION

The present invention relates to rotor systems, and more particularly, to rotor systems having oil slingers.

BACKGROUND

Rotor systems, such as blowers, that effectively use oil slingers remain an area of interest. Some existing systems have various shortcomings, drawbacks, and disadvantages relative to certain applications. Accordingly, there remains a need for further contributions in this area of technology.

SUMMARY

One embodiment of the present invention is a unique blower having an oil slinger system. Another embodiment is a unique rotor system having an oil slinger system. Other embodiments include apparatuses, systems, devices, hardware, methods, and combinations for rotor systems, blowers and other apparatuses that employ oil slinger systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein:

FIG. 2 is an isometric view of some aspects of a non-limiting example of an oil slinger system in accordance with an embodiment of the present invention.

FIGS. 3 and 3A are an isometric and a partial view of some aspects of a non-limiting example of an oil slinger system in accordance with an embodiment of the present invention.

DETAILED DESCRIPTION

Figure 1:
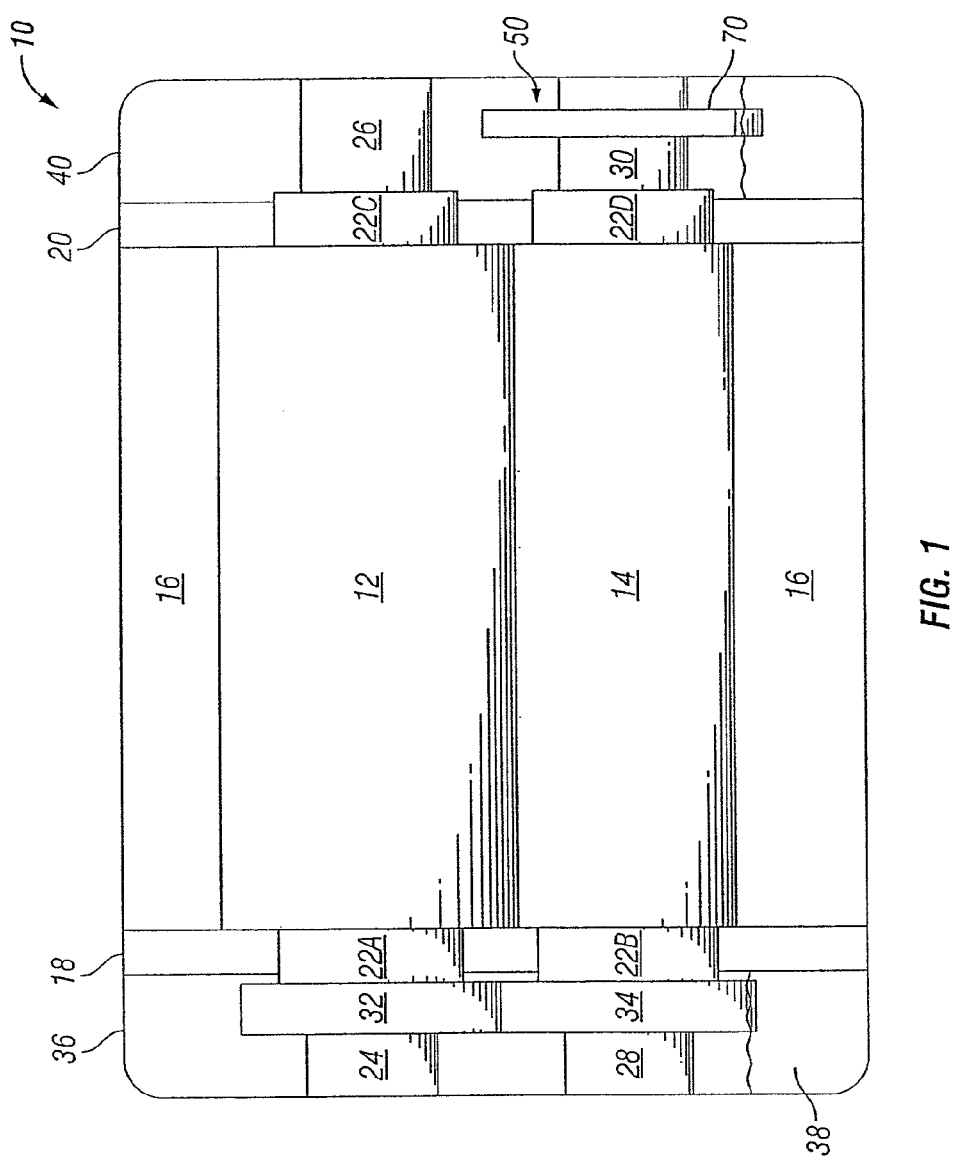
FIG. 1 schematically illustrates some aspects of a non-limiting example of a blower in accordance with an embodiment of the present invention.
Figure 4:
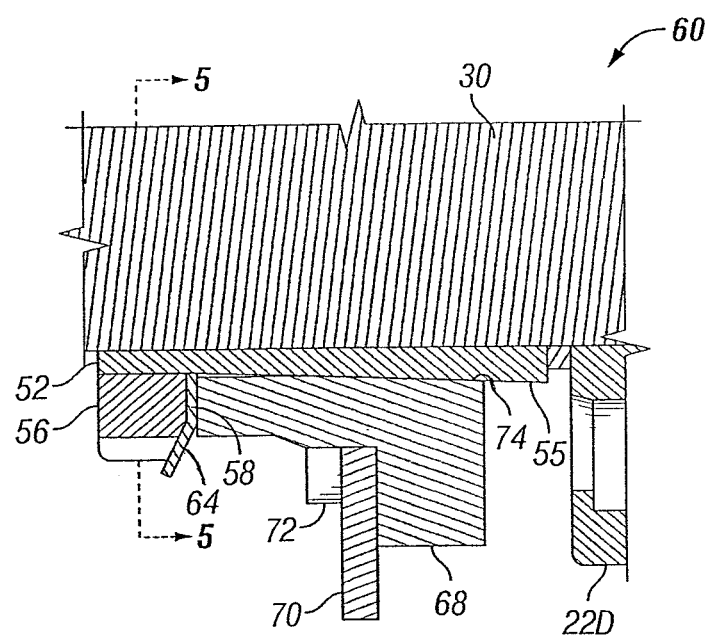
FIG. 4 is an axial cross-section illustrating some aspects of a non-limiting example of an oil slinger system in accordance with an embodiment of the present invention.
Figure 5:
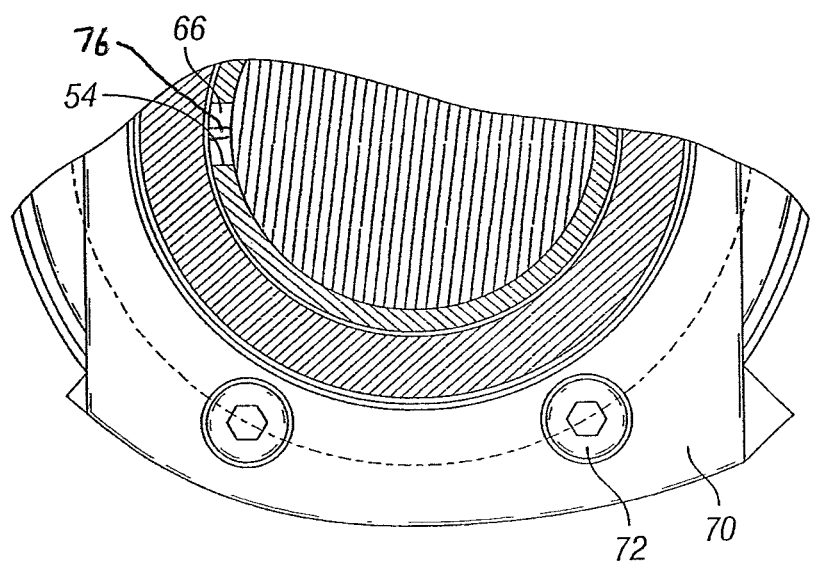
FIG. 5 is a cross-section illustrating some aspects of a non-limiting example of an oil slinger system in accordance with an embodiment of the present invention, depicting, among other things, and anti-rotation feature in the form of a slot in an adapter sleeve engaging and anti-rotation feature in the form of a tang of a retaining element.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, some aspects of a non-limiting example of an apparatus 10 are schematically illustrated in accordance with an embodiment of the present invention. In one form, apparatus 10 is a rotor system. In a more particular form, apparatus 10 is a blower, and hence is referred to herein as blower 10. In other embodiments, apparatus 10 may be any rotor system or any system that employs an oil slinger. In one form, blower 10 is a Roots-type blower. In other embodiments, blower 10 may be any other type blower. Blower 10 includes blower elements in the form of two rotors 12 and 14 disposed in a rotor housing 16 and axially retained between side plates 18 and 20. Each rotor 12, 14 is supported on both sides by a bearing 22, e.g., bearings 22A, 22B, 22C and 22D via respective shafts 24, 26, 28 and 30 extending from rotors 12 and 14, illustrated in FIG. 1. In various embodiments, each of shafts 24, 26, 28 and 30 may or may not be integral with respective rotors 12 and 14. Coupled to shafts 24 and 28 are two gears 32 and 34, respectively. Gears 32 and 34 are in mesh, and are configured to maintain relative rotational alignment between rotors 12 and 14. Gears 32 and 34 are disposed in an oil tank 36 in which an oil bath 38 is maintained for splash lubrication of gears 32 and 34, and bearings 22A and 22B disposed adjacent to gears 32 and 34. Disposed in an oil tank 40 is an oil slinger system 50 drivingly engaged by shaft 30 for providing splash lubrication to bearings 22C and 22D via an oil slinger 70 engaging a second oil bath 38.

Referring to FIGS. 2, 3, 3A and 4, some aspects of a non-limiting example of oil slinger system 50 in accordance with an embodiment of the present invention are depicted. Oil slinger system 50 includes an adapter sleeve 52 having a slot 54; a threaded lock nut 56; a retaining element 58; and an oil slinger assembly 60. Adapter sleeve 52 has an inside diameter that is receivable over the outside diameter of shaft 30. The external surface of adapter 52 includes a conical or tapered surface 55. Lock nut 56 includes a plurality of anti-rotation features 62. The number of anti-rotation feature may vary with the needs of the particular application. In one form, anti-rotation features 62 are slots in the outer diameter of lock nut 56. In other embodiments, anti-rotation features 62 may take other forms e.g., including slots or openings or indentations or any suitable feature on any desired portion of lock nut 56. Lock nut 56 has internal threads configured to engage mating external threads on adapter sleeve 52.

Retaining element 58 includes a plurality of anti-rotation features 64 and an anti-rotation feature 66. In one form, retaining element 58 is a tabbed washer, wherein anti-rotation features 64 are in the form of external tabs or tangs, and wherein anti-rotation feature 66 is an internal tab or tang. The number of anti-rotation features 64 and 66 may vary with the needs of the application. In addition the form of anti-rotation feature 64 and 66 may vary from one embodiment to another and in accordance with the needs of the application. Slot 54 of adapter sleeve 52 is an anti-rotation feature, and is configured to engage anti-rotation feature 66 to prevent rotation between retaining element 58 and adapter sleeve 52. Anti-rotation features 66 are configured to engage anti-rotation features 62 in order to prevent rotation between retaining element 58 and lock nut 56. Because retaining element 58 is anti-rotated relative to adapter sleeve 52 via the engagement of anti-rotation tang 66 with slot 54, the co-engagement of anti-rotation features 62 and 66 prevents the rotation of lock nut 56 relative to adapter sleeve 52.

Oil slinger assembly 60 includes a hub 68, and oil slinger 70, and a plurality of threaded fasteners 72, e.g., cap screws, configured to secure oil slinger 70 to hub 68. Oil slinger 70 extends outward from hub 68. In one form, oil slinger 70 includes an opening configured to be received over at least a portion of hub 68 e.g., wherein the oil slinger 70 opening is an internal diameter, and wherein hub 68 includes an outer diameter configured to engage the internal diameter of oil slinger 70. In other embodiments, other means may be employed to secure oil slinger 70 to hub 68. The shape of oil slinger 70 may vary to suit the needs of the application. Hub 68 includes an internal conical or tapered surface 74, which is configured to engage tapered surface 55 of adapter sleeve 52. In one form, during assembly, oil slinger 70 is attached to hub 68 via fasteners 72; and oil slinger assembly 60 is installed onto adapter sleeve 52. Retaining element 58 is then installed over adapter sleeve 52, with anti-rotation feature 66 engaging and sliding into anti-rotation feature 54, and then, lock nut 56 is threaded onto adapter sleeve 52. The assembly is then installed onto shaft 30. In other embodiments, other assembly sequences may be employed. For example, adapter sleeve 52 may be installed onto shaft 30 prior to the installation of one or more of oil slinger assembly 60, retaining element 58 and lock nut 56 onto adapter sleeve 52. In any event, once adapter sleeve 52 is installed onto shaft 30; oil slinger 70 is attached to hub 68; and oil slinger assembly 60, retaining element 58 and lock nut 56 are installed onto adapter sleeve 52 e.g., with a sliding fit, lock nut 56 is tightened, e.g., to a desirable torque value within a predetermined torque range, such that one or more anti-rotation feature 66 of retaining element 58 lines up with one or more anti-rotation feature 62 of lock nut 56. One or more of anti-rotation features 66 that are lined up with anti-rotation feature 62 are then displaced, e.g., bent, at least partially into anti-rotation feature 62, to thereby prevent any rotation of lock nut 56, e.g., to prevent loosening during operation. During the tightening of lock nut 56, the displacement of lock nut 56 generates an axial force that drives tapered surfaces 55 and 74 into contact. By virtue of the axial force acting against the wedge angle formed by the tapered surfaces, adapter sleeve 52 is driven into compression, reducing the internal diameter of adapter sleeve 52 and yielding an interference fit between adapter sleeve 52 and shaft 30. This interference fit secures adapter sleeve 52 against rotation relative to shaft 30. In some embodiments, adapter sleeve 52 includes a slot, e.g., a slot 76 extending partially or fully along the length of adapter sleeve 52, which allows adapter sleeve 52 to be more readily compressed. In addition, by virtue of the axial force acting against the wedge angle formed by tapered surfaces 55 and 74, an interference fit, e.g., a forced-fit tapered engagement, between hub 68 and adapter sleeve 52 is formed, which secures oil slinger assembly 60 against rotation relative to adapter sleeve 52, hence securing oil slinger assembly 60 and oil slinger 70 against rotation relative to shaft 30.

An oil slinger attached to a rotating shaft is provided. Generally, the oil slinger is mounted to a rotating shaft, and more particularly, the oil slinger is mounted to the shaft of a blower in a removable fashion using a compression type fitting. In one embodiment, the oil slinger is secured to an oil slinger hub via screws, and the oil slinger hub is placed onto a tapered section of a slotted adapter sleeve surrounding the rotor shaft. A lock nut and retaining element are then screwed over the narrow diameter end of the sleeve, where the slot of the sleeve is widest, to press the slinger hub up the taper of the sleeve, thereby compressing the sleeve onto the shaft and securing the slinger hub to the sleeve. An advantage of this mounting arrangement is that the oil slinger is less likely to become loose during use (e.g., due to thermal shifts) while still permitting disassembly for purposes of service or reuse.

One example aspect of the present disclosure provides an apparatus having a rotatably mounted shaft, an adapter sleeve, a hub, an oil slinger, a lock nut, and a retaining element. The shaft may be rotatably mounted in any known fashion such as by, for example, a bearing. The adapter sleeve is mounted about or coupled to the shaft and has a tapered or frustoconical outer surface. A narrower end of the adapter sleeve is mounted toward a first end of the shaft. The hub is mounted about the adapter sleeve and has a frustoconical inner surface that mates with the frustoconical outer surface of the adapter sleeve. The hub is further provided with two sections where a first section has a radial dimension that is smaller than a radial dimension of the second section. The oil slinger, which has at least one radial dimension larger than the second section of the hub, is mounted to the hub adjacent the second section and about the first section. The oil slinger is fixedly attached to the second section by fasteners such as, for example, threaded fasteners such as, for example, one or more screws. The lock nut is mounted about the adapter sleeve adjacent to the first section of the hub. A retaining element may also be provided disposed between the hub and the lock nut. The adapter sleeve may have a slot that is generally parallel to the longitudinal axis of the shaft for retaining the retaining ring. In addition, a rotor may be mounted to an end of the shaft.

An apparatus may comprise a rotatably mounted shaft having a first end and a second end and a longitudinal axis therethrough; an adapter sleeve having a frustoconical outer surface, and being coupled to said shaft, and being disposed between said first end and said second end, with a narrower end of said adapter sleeve mounted adjacent said first end; a hub mounted having a frustoconical inner surface, and being coupled about said adapter sleeve, wherein said frustoconical outer surface mates with said frustoconical inner surface; wherein said hub has a first section with a first radial dimension and a second section with a second radial dimension that is larger than said first radial dimension; an oil slinger mounted said hub, adjacent said second section and about said first section, wherein said oil slinger is fixedly attached to said second section via one or more fasteners; a lock nut mounted about said adapter sleeve adjacent said first section; a retaining element mounted about said adapter sleeve and disposed between said lock nut and said first section. The adapter sleeve may include a slot parallel with said longitudinal axis for retaining said retaining element. The apparatus may further include a rotor fixedly mounted to said second end of said shaft.

A blower may comprise a housing; a shaft rotatably mounted to said housing and having a first end and a second end and a longitudinal axis therethrough; an adapter sleeve having a frustoconical outer surface, and being coupled to said shaft, and being disposed between said first end and said second end, with a narrower end of said adapter sleeve mounted adjacent said first end; a hub mounted having a frustoconical inner surface, and being coupled about said adapter sleeve, wherein said frustoconical outer surface mates with said frustoconical inner surface; wherein said hub has a first section with a first radial dimension and a second section with a second radial dimension that is larger than said first radial dimension; an oil slinger mounted said hub, adjacent said second section and about said first section, wherein said oil slinger is fixedly attached to said second section via one or more fasteners; a lock nut mounted about said adapter sleeve adjacent said first section; a retaining element mounted about said adapter sleeve and disposed between said lock nut and said first section. The adapter sleeve may include a slot parallel with said longitudinal axis for retaining said retaining element. The apparatus may include a rotor fixedly mounted to said second end of said shaft and housed within said housing.

Embodiments of the present invention include a blower comprising: a blower element; a shaft coupled to the blower element; an adapter sleeve receivable on the shaft and having threads and a tapered surface; an oil slinger assembly having an oil slinger, wherein the oil slinger assembly includes a tapered surface configured to engage the adapter sleeve tapered surface; a lock nut having threads configured to engage the adapter sleeve threads; and a retaining element configured to prevent rotation of the lock nut.

In a refinement, the blower may include a screw configured to secure the oil slinger to the oil slinger assembly.

In another refinement, the oil slinger assembly includes a hub; and wherein the oil slinger includes an opening configured for receiving the oil slinger onto the hub.

In yet another refinement, the adapter sleeve has an interference fit with the shaft.

In yet still another refinement, the lock nut is configured to generate an axial force and drive the oil slinger assembly tapered surface into the adapter sleeve tapered surface to compress the adapter sleeve and form the interference fit.

In yet still another refinement, the adapter sleeve includes an anti-rotation feature; the retaining element includes an anti-rotation feature; and the retaining element anti-rotation feature is configured to engage the adapter sleeve anti-rotation feature and prevent rotation between the retaining element and the adapter sleeve.

In a further refinement, the retaining element includes an anti-rotation feature configured to prevent rotation between the retaining element and the lock nut; and the lock nut includes an anti-rotation feature configured to engage the retaining element anti-rotation feature.

In a still further refinement, the oil slinger assembly includes a hub; the oil slinger extends outward from the hub; the oil slinger assembly tapered surface is disposed on the hub; and the oil slinger assembly tapered surface has an interference fit with the adapter sleeve tapered surface.

In a yet still further refinement, the lock nut is configured to generate an axial force and drive the oil slinger assembly tapered surface into the adapter sleeve tapered surface and form the interference fit.

Embodiments of the present invention include a rotor system, comprising: a shaft; an adapter sleeve disposed about the shaft and having a tapered surface; an oil slinger assembly having an oil slinger, wherein the oil slinger assembly includes a tapered surface configured to engage the adapter sleeve tapered surface; a lock nut configured to threadingly engage the adapter sleeve; and a retaining element configured to prevent rotation of the lock nut relative to the adapter sleeve.

In a refinement, the rotor system further comprises a threaded fastener configured to secure the oil slinger to the oil slinger assembly.

In another refinement, the oil slinger assembly includes a hub; and wherein the oil slinger includes an opening configured for receiving the oil slinger onto the hub.

In still another refinement, the adapter sleeve has an interference fit with the shaft.

In still another refinement, the lock nut is configured to generate an axial force and drive the oil slinger assembly tapered surface into the adapter sleeve tapered surface to compress the adapter sleeve and form the interference fit.

In yet still another refinement, the adapter sleeve includes an anti-rotation feature; the retaining element includes an anti-rotation feature; and the retaining element anti-rotation feature is configured to engage the adapter sleeve anti-rotation feature and prevent rotation between the retaining element and the adapter sleeve.

In a further refinement, the retaining element includes an anti-rotation feature configured to prevent rotation between the retaining element and the lock nut; and the lock nut includes an anti-rotation feature configured to engage the retaining element anti-rotation feature.

In a still further refinement, the oil slinger assembly includes a hub; the oil slinger extends outward from the hub; the oil slinger assembly tapered surface is disposed on the hub; and the oil slinger assembly tapered surface has an interference fit with the adapter sleeve tapered surface.

In a yet still further refinement, the lock nut is configured to generate an axial force and drive the oil slinger assembly tapered surface into the adapter sleeve tapered surface and form the interference fit.

Embodiments of the present invention include an apparatus comprising: a rotatably mounted shaft having a first end and a second end and a longitudinal axis therethrough; an adapter sleeve having a frustoconical outer surface, and being coupled to the shaft, and being disposed between the first end and the second end, with a narrower end of the adapter sleeve mounted adjacent the first end; a hub mounted having a frustoconical inner surface, and being coupled about the adapter sleeve, wherein the frustoconical outer surface mates with the frustoconical inner surface; wherein the hub has a first section with a first radial dimension and a second section with a second radial dimension that is larger than the first radial dimension; an oil slinger mounted the hub, adjacent the second section and about the first section, wherein the oil slinger is fixedly attached to the second section via one or more fasteners; a lock nut mounted about the adapter sleeve adjacent the first section; a retaining element mounted about the adapter sleeve and disposed between the lock nut and the first section.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus comprising:
   a rotatably mounted shaft having a first end and a second end and a longitudinal axis therethrough;
   an adapter sleeve having a frustoconical outer surface, and being coupled to the shaft, and being disposed between the first end and the second end, with a narrower end of the adapter sleeve mounted adjacent the first end;
   a hub having a frustoconical inner surface, and being coupled about the adapter sleeve, wherein the frustoconical outer surface mates with the frustoconical inner surface;
   wherein the hub has a proximal section having an outer surface, a first section with an outer surface having a first radial dimension larger than a radial dimension of the outer surface of the proximal section, a second section with an outer surface having a second radial dimension that is larger than the first radial dimension, and a mounting surface that extends between the outer surface of the first section and the outer surface of the second section;
   an oil slinger mounted to the mounting surface of the hub, adjacent the second section and about the first section, wherein the oil slinger is fixedly attached to the second section via one or more fasteners, and wherein the oil slinger includes a plurality of projections extending radially outward from a center of rotation and that are structured to sling oil;
   a lock nut mounted about the adapter sleeve adjacent the first section;
   a retaining element mounted about the adapter sleeve and disposed between the lock nut and the first section.

2. A blower comprising:
   a blower element;
   a shaft coupled to the blower element;
   an adapter sleeve receivable on the shaft and having threads and a tapered surface;
   an oil slinger assembly having an oil slinger, wherein the oil slinger assembly includes a hub having a tapered surface configured to engage the adapter sleeve tapered surface, wherein the hub includes a narrow end outer surface, an intermediate middle outer surface, and a wide end outer surface, the intermediate middle outer surface including a radius larger than the narrow end outer surface and smaller than the wide end outer surface, a mounting surface extending from the intermediate middle outer surface, wherein the oil slinger is mounted on the mounting surface, and wherein the oil slinger includes an elongate projection that extends outwardly;
   a lock nut having threads configured to engage the adapter sleeve threads; and
   a retaining element configured to prevent rotation of the lock nut.

3. The blower of claim 2, further comprising a fastener configured to secure the oil slinger to the oil slinger assembly.

4. The blower of claim 2, wherein the oil slinger includes an opening configured for receiving the oil slinger onto the hub.

5. The blower of claim 2, wherein the adapter sleeve has an interference fit with the shaft.

6. The blower of claim 5, wherein the lock nut is configured to generate an axial force and drive the oil slinger assembly tapered surface into the adapter sleeve tapered surface to compress the adapter sleeve and form the interference fit.

7. The blower of claim 2, wherein the adapter sleeve includes an anti-rotation feature; wherein the retaining element includes an anti-rotation feature; and wherein the retaining element anti-rotation feature is configured to engage the adapter sleeve anti-rotation feature and prevent rotation between the retaining element and the adapter sleeve.

8. The blower of claim 2, wherein the retaining element includes an anti-rotation feature configured to prevent rotation between the retaining element and the lock nut; and wherein the lock nut includes an anti-rotation feature configured to engage the retaining element anti-rotation feature.

9. The blower of claim 8, wherein the lock nut anti-rotation feature includes a slot in the lock nut; and wherein the retaining element anti-rotation feature includes a tang configured to be displaced into engagement with the slot.

10. The blower of claim 2, wherein the oil slinger extends outward from the hub; wherein the oil slinger assembly tapered surface is disposed on the hub; and wherein the oil slinger assembly tapered surface has an interference fit with the adapter sleeve tapered surface.

11. The blower of claim 10, wherein the lock nut is configured to generate an axial force and drive the oil slinger assembly tapered surface into the adapter sleeve tapered surface and form the interference fit.

12. A rotor system, comprising:
    a shaft;
    an adapter sleeve disposed about the shaft and having a tapered surface;
    an oil slinger assembly having an oil slinger, wherein the oil slinger assembly includes a hub having a tapered surface configured to engage the adapter sleeve tapered surface, wherein the hub includes a narrow end outer surface, an intermediate middle outer surface, and a wide end outer surface, the intermediate middle outer surface including a radius larger than the narrow end outer surface and smaller than the wide end outer surface, a mounting surface extending from the intermediate middle outer surface, wherein the oil slinger is mounted on the mounting surface, and wherein the oil slinger includes a plurality of radially outwardly extending projections which are structured to sling oil;
    a lock nut configured to threadingly engage the adapter sleeve; and
    a retaining element configured to prevent rotation of the lock nut relative to the adapter sleeve.

13. The rotor system of claim 12, further comprising a threaded fastener configured to secure the oil slinger to the oil slinger assembly.

14. The rotor system of claim 12, wherein the oil slinger includes an opening configured for receiving the oil slinger onto the hub.

15. The rotor system of claim 12, wherein the adapter sleeve has an interference fit with the shaft.

16. The rotor system of claim 15, wherein the lock nut is configured to generate an axial force and drive the oil slinger assembly tapered surface into the adapter sleeve tapered surface to compress the adapter sleeve and form the interference fit.

17. The rotor system of claim 12, wherein the adapter sleeve includes an anti-rotation feature; wherein the retaining element includes an anti-rotation feature; and wherein the retaining element anti-rotation feature is configured to engage the adapter sleeve anti-rotation feature and prevent rotation between the retaining element and the adapter sleeve.

18. The rotor system of claim 12, wherein the retaining element includes an anti-rotation feature configured to prevent rotation between the retaining element and the lock nut; and wherein the lock nut includes an anti-rotation feature configured to engage the retaining element anti-rotation feature.

19. The rotor system of claim 12, wherein the oil slinger extends outward from the hub; wherein the oil slinger assembly tapered surface is disposed on the hub; and wherein the oil slinger assembly tapered surface has an interference fit with the adapter sleeve tapered surface.

20. The rotor system of claim 19, wherein the lock nut is configured to generate an axial force and drive the oil slinger assembly tapered surface into the adapter sleeve tapered surface and form the interference fit.

* * * * *